United States Patent [19]
Garcia

[11] 3,830,371
[45] Aug. 20, 1974

[54] LIQUID-LIQUID SEPARATION

[75] Inventor: Juan A. Garcia, Kingsville, Tex.

[73] Assignee: Esso Production Research Company, Houston, Tex.

[22] Filed: Dec. 27, 1972

[21] Appl. No.: 319,105

[52] U.S. Cl.................. 210/265, 210/23, 210/279, 210/DIG. 5
[51] Int. Cl.......................................... B01d 23/10
[58] Field of Search ......... 210/23, 30, 80, 265, 266, 210/282, 296, 351, 391, DIG. 5, 279

[56] References Cited
UNITED STATES PATENTS

| | | | |
|---|---|---|---|
| 247,117 | 9/1881 | Scharff | 210/266 X |
| 898,545 | 9/1908 | Barnes | 210/282 |
| 1,947,709 | 2/1934 | Garrison et al. | 210/265 X |
| 3,179,603 | 4/1965 | Edwards et al. | 210/23 X |
| 3,199,676 | 8/1965 | May | 210/DIG. 5 |
| 3,617,548 | 11/1971 | Willihnganz | 210/23 |

*Primary Examiner*—Samih N. Zaharna
*Assistant Examiner*—Robert G. Mukai
*Attorney, Agent, or Firm*—John S. Schneider

[57] ABSTRACT

An apparatus for separating a mixture of heavier and lighter liquids capable of separating into two separate phases is disclosed. The mixture is passed through confined particle material which, preferably, has an affinity for one of the liquids. The particles are confined in a cylindrically shaped space and the liquids move through the particles in a radial and horizontal direction. The particle material filters the liquids and aids in coalescing the liquid for which the particles have affinity. The liquids separate by gravity and are discharged separately. The particles are backwashed periodically to remove collected solids. During the backwash operation the particles are unconfined and are flushed by upward flow of backwash liquid into a space which is larger in cross-section than the cross-section in which the particles are confined during filtering-coalescing operations. Following backwashing the particles, which have a greater density than the backwash liquid, settle by gravity to their filtering-coalescing position and are again confined.

1 Claim, 1 Drawing Figure

PATENTED AUG 20 1974 3,830,371
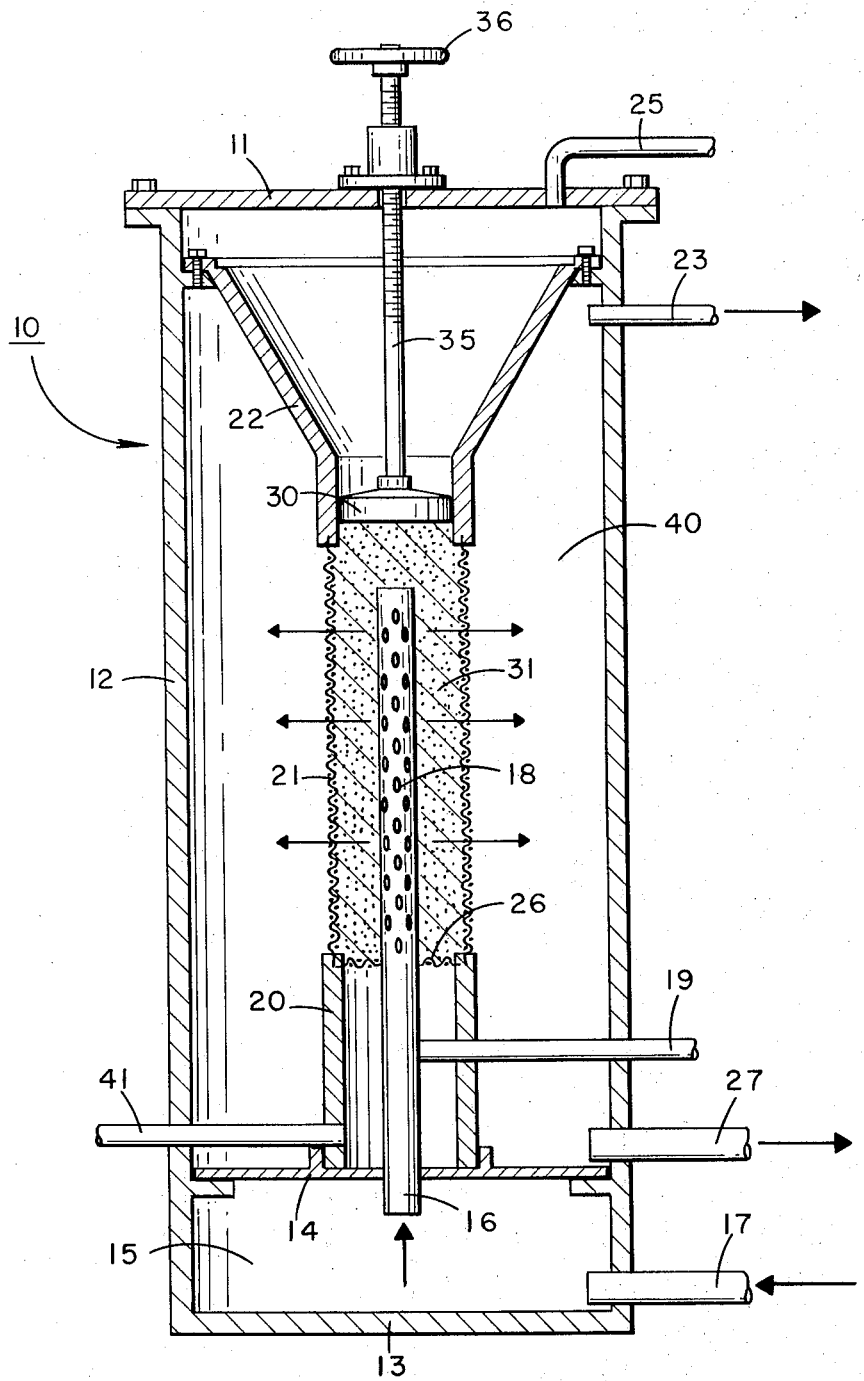

LIQUID-LIQUID SEPARATION

BACKGROUND OF THE INVENTION

The present invention concerns an apparatus for filtering solids from liquid mixtures, coalescing one of the liquids and then separating the liquids in the mixture from each other. More particularly, the present invention concerns coalescing the oil phase of a liquid mixture of oil and water and then separating the oil and water.

Filters-coalescers, particularly those used in the separation of liquids having different specific gravities such as oil and water have used composite materials such as for example cloth, fiber glass, synthetics, etc. as the filtering-coalescing medium. Backwashing in such filters-coalescers is inefficient and in many instances fails to remove solids trapped in the pores of the filter-coalescer material. Sand bed filters are adequate in removing oil from water by trapping oil and solids within the filter bed. However, a filter of this type requires backwashing and a product is produced which is not marketable and which creates a disposal problem.

SUMMARY OF THE INVENTION

The present invention, briefly, includes an apparatus for separating a mixture of heavier and lighter liquids capable of separating into separate phases which comprises a closed vessel and an inner porous member extending vertically within the vessel and enclosing a space into which the liquid mixture is introduced. An outer porous member extends vertically within the vessel and is spaced from and surrounds the inner porous member. Particles or granules, which preferably have an affinity for one of the liquids, are arranged in the space between the inner and outer porous members to filter and coalesce those liquids. Closure means is provided adjacent the upper end of the inner and outer porous members to prevent, when closed, flow of liquids therefrom and movement of the particles from the space between the inner and outer porous members. Partition means extend from the upper end of the outer porous member to the wall or walls of the closed vessel. The partition means together with the closure means, when closed, divide the vessel into upper and lower isolated sections. The liquids to be separated pass radially through the inner porous member, the particles and the outer porous member into the lower section. Means are provided in the lower section for separately discharging the lighter liquid and the heavier liquid from the vessel. The mixture of heavier and lighter liquids is flowed upwardly in the vessel within the inner porous member and thence radially outwardly through the inner porous member, the particles and the outer porous member. The liquids separate by gravity in the lower section and the heavier and lighter liquids are separately discharged from the vessel.

In conventional flat bed filters or filter-coalescers the velocity of the liquid through the filter-coalescer media particles is constant and is fixed by the cross-sectional area of the bed of particles. A radial flow filter or filter-coalescer has a varying velocity through the filter-coalescer media particles. Flow of liquids through the media particles is radial and horizontal. The particles are confined in a cylindrically shaped space and do not move under changing liquid velocity or pressure. The velocity of the liquid exiting the particles is the slowest. This characteristic of radial flow coalescing is advantageous because the size of an oil drop formed in the particles is largely dependent on the fluid velocity in the pores formed by the particles making up the media. In a flat bed filter-coalescer the number of pores at the entrance and exit of the bed of particles is the same. In a radial flow filter-coalescer the number of pores increases away from the center. Therefore, the fluid velocity of the liquids decreases as it moves away from the center. Also, the flow area is significantly greater for a radial flow type filter-coalescer than for a flat bed type filter-coalescer. A greater liquid volume can be processed across the radial flow type filter-coalescer for the same liquid exit velocity as in the flat bed type filter coalescer. Further, if solids exist in the liquids being treated in a downflow flat bed type filter-coalescer such solids will be trapped in the upper part of the flat bed while the rest of the bed remains essentially clean. The radial flow type system allows solids to be distributed throughout the bed height and this extends the period before cleanup of the media is required. In comparing coalescing capacities of the flat bed type system and the radial flow type system the latter has an advantage for in the flat bed system if the oil becomes attached to the filter material and the velocity is high the small oil drops will move through the media. These drops are generally very small and difficult to separate by gravity. If the liquid velocity is low then the oil will not move through the media. Before oil is released the media particles must become saturated. In a high solids stream the media particles may become plugged before they become saturated and oil then is not coalesced for removal. On the other hand, in the radial flow system the velocity at the center is high which forces the oil to the exterior of the media particles where the velocity is low and coalescence into larger drops can occur. Only the exterior layers of the media particles need to become saturated for oil to become coalesced and released. Since better solids distribution is made on the inner center in the radial flow type system longer runs are made possible before media particles cleanup is required. In a flat bed type system where flow of the liquids is downward, the natural gravity rise of oil drops in the bed is opposed; if the flow of liquids is upwards, holding the media particles down once solids begin to plug up pores becomes difficult. The radial flow system permits oil flow by gravity and in addition, the media particles are confined and immobile no matter what the pressure drop is across the particles.

BRIEF DESCRIPTION OF THE DRAWINGS

The sole FIGURE illustrates a radial flow type filter-coalescer in accordance with the invention.

DESCRIPTION OF THE PREFERRED EMBODIMENTS

Referring to the FIGURE there is shown a closed cylindrically shaped vessel 10 having a top 11, side wall 12 and bottom 13. The lower portion of vessel 10 contains a solid impervious partition 14 which isolates a bottom compartment 15 of the vessel (except for the lower end of a pipe 16 which extends vertically therethrough). An inlet 17 connects a feed source not shown and compartment 15. A portion of the vertical extension of pipe 16 contains perforations or openings to form a cylindrically shaped screen 18. The top end of screen 18 is closed. An outlet pipe 19, connected to the solid nonperforated portion of pipe 16, extends to the exterior of vessel 10. A solid, impervious cylindrically shaped interior wall member 20 extends from partition 14 to adjacent the lower end of screened member 18. A cylindrically shaped porous or screen member 21 extends upwardly from interior wall 20 to another solid, impervious partition 22 which is conically shaped, tapering inwardly and downwardly. The upper end of partition 22 is bolted to vessel 10 above an outlet 23 in the wall of vessel 10. Outlet 23 and a lower outlet 27 function to discharge liquids separated in midsection 40 of vessel 10. An outlet pipe 25 is formed in the top 11 of vessel 10. Also a removable closure plate or member 30 is normally positioned on top of particles or granules 31 which fills the space enclosed by screen 21 (and surrounding screen 18), a bottom screen 26 and closure plate 30. A threaded rod 35 provided with a handle 36 is connected to closure plate 30. Turning handle 36 and thereby rod 35 causes closure plate 30 to be raised from or lowered to the top of screen 21. When raised, the top of screen 21 is open to permit flushing of the particles or granules into the space formed by partition 22.

The operation of the apparatus is as follows: A mixture of liquids, with or without solids, is fed into compartment 15 through inlet 17. The liquids then pass through pipe 16 into the screen or perforated portion 18 thereof. The liquids pass radially through the porous particle material 31 where one liquid phase (oil) coalesces and separates from the other liquid phase (water). Solids, if present, are also filtered out by the particles 31. The liquid phases gravity separate in the middle section 40 and the lighter phase is withdrawn or discharged from vessel 10 through outlet 23 and the heavier phase is discharged through outlet 27. In this operation outlet 19 and outlet 25 are closed. A backwash inlet 41, which connects a source of backwash liquid and/or gas to the interior of wall 20 below screen 26 is also closed.

When it is desired to backwash the filtercoalescer particles 31 to remove solids which have collected outlets 23 and 27 are closed, outlet 19 is opened and inlet 17 is closed. Inlet 41 and outlet 25 are opened and rod 35 is operated to remove plate 30 from the top of screen 21. Backwash liquid moves upwardly through the filter particles forcing the particles into the flushing cone or funnel defined by wall 22. The backwash liquid passes through outlet 25 along with the solid material filtered out by the particles. The granules or particles are heavier than the backwash liquid and when the backwash liquid is cut off by closing inlet 41 the particles settle into their original position in the space enclosed by screen 21. Then closure plate 30 is returned to its initial position and outlet 25 is closed and outlet 19 is closed. During the backwashing operation liquids and solids, if any, passing into perforated pipe 18 are discharged through outlet 19. Then inlet 17 is opened and outlets 27 and 23 are opened and the filtering and coalescing operation is begun again.

The filter-coalescer particles or granules may be any desired material such as sand. When separating mixtures of oil and water the material preferably has an affinity for oil. Such a material may suitably be a weighted, solid polyolefin of an alpha monoolefin having two to eight carbon atoms per molecule and preferably solid polyethylene or solid polypropylene. The polypropylene may be produced as is well known using a Ziegler catalyst to have a molecular weight which may range from about 10,000 to 1,000,000 or more. The manner in which the solid polyethylene is produced is also well known. The density of the polypropylene may range from about 0.88 to about 0.91 whereas in the high pressure process for producing polyethylene the density may range from 0.91 to about 0.95 and the polyethylene produced by the Ziegler catalyst may have a density from about 0.94 to about 0.98. Other catalysts and processes may be used to produce the polyolefin. For example, chromium oxide on silicon peroxide and other oxygen yielding materials may be used.

The solid polyolefin is admixed with a sufficient amount of a filler or weighting agent to provide polyolefin of a density of at least about 1.3 and preferably within the range of about 1.3 to about 2.4 although higher densities up to about 3.0 may be used. The amount of filler or weighting agent will depend on the filler or weighting agent selected and the density selected and may range from about 35 to about 400 percent by weight based on the polyolefin. The material is then thoroughly admixed in a Banberry or equivalent mixing apparatus at a temperature of about 350° F. to about 550° F. and then extruded and then formed into particles passing desired size sieves.

The filler or weighting agent may be selected from a wide range of materials such as barium oxide (BaO), barium hydroxide [Ba(OH$_2$)], barium sulfate (BaSO$_4$), lead sulfide (PbS), lead oxide (PbO), copper, iron, zinc, tin, aluminum, galena cerussite, magnetite, pyrite, sphalerite and witherite, silicon dioxide, ceramic material, etc.

The particles are properly conditioned before use to separate small amounts of oil from water or aqueous solutions and the like by treating or wetting the surface of the particles with an oleophilic liquid such as crude petroleum or hydrocarbon distillate or oils. An excellent conditioning technique is to boil the weighted polyolefin particles in the crude oil or light distillate or a mixture of light distillate in less volatile heavy oil. The excess oil is drained off and the bed is then suitable for separating oil from water and particularly small amounts of oil from water.

The conditioning treatment removes air or other gas or vapor from the weighted particles and renders them immediately receptive to coalescing of the oil.

Another type of material which may be used to filter and coalesce an oil-water mixture which has a high affinity for oil is one which contains an internal particle or base structure, a coating or substrate which covers the base structure and a plurality of oleophilic-hydrophobic granules which adhere to the substrate and provide a substantially continuous outer surface on the particle. The plurality of granules which form the outer surface of the particle imparts a roughened texture which assists in removing oil from an oil-water mixture by physical entrapment. The preferred material for the internal particle is screened sand; however, other suitable solids may be used such as glass, garnet, alumina, etc. A number of suitable materials employable as the substrate include thermosetting plastics such as furan or phenolformaldehyde and thermoplastics such as polyethylene, polypropylene or polymeric amide. The preferred material, however, is a low viscosity epoxy resin with a suitable hardening agent. A suitable coupling agent may also be employed with the epoxy resin mixture to insure a good bond between the internal particle and the substrate and between the substrate and the exterior coating of the granules. The preferred materials for use as granules are fumed silicon dioxide which has been treated with silane to impart a high degree of water-repellency due to the surface chemistry of the granules. Fumed silicon dioxide is produced by the hydrolysis of silicon tetrachloride in a flame process. The resultant material has a non-porous amorphous nature and fuses into long, branched submicron sized aggregates. These aggregates are hydrophilic in nature due to the large number of hydroxyl groups present on the surface. A silane reacts with the base silicon dioxide, and during this reaction, hydrophobic hydrocarbon groups replace many of the hydroxyl groups. A suitable silane for reaction with the fumed silicon dioxide results in a trimethylsilyl group on the surface of the fumed silicon dioxide. This reaction changes the surface character of the silicon dioxide from hydrophilic to strongly hydrophobic. A suitable silanetreated fumed silicon dioxide for use in the practice of this invention is sold under the trade mark "Silanox" by Cabot Corporation, Boston, Massachusetts.

These particles and their manner of preparation are disclosed and claimed in U.S. Pat. application, Ser. No. 319,071 filed on Dec. 27, 1972 by C. E. Cook, Jr. and entitled "Liquid-Liquid Separation."

Changes and modifications may be made in the specific illustrative embodiments of the invention shown and/or described herein without departing from the scope of the invention as defined in the appended claims.

Having fully described the apparatus, process, objects and advantages of my invention, I claim:

1. Apparatus for filtering and separating a mixture of oil and water comprising:
   an upright cylindrically shaped closed vessel;
   an upright pipe member extending through the bottom of said vessel upwardly into the center thereof;
   an upright cylindrically shaped screen arranged in said vessel and spaced from and surrounding said pipe member;
   a flat screen attached to the bottom end of said cylindrically shaped screen and, together with said pipe member, closing the bottom end of said cylindrically shaped screen, said pipe member being perforated above said flat screen;
   inlet means for introducing washwater through said flat screen into the space enclosed by said cylindrically shaped screen;
   openable closure means arranged adjacent the top end of said cylindrically shaped screen;
   funnel-shaped partition means extending from the top end of said cylindrically shaped screen to the wall of said closed vessel;
   oleophilic and hydrophobic particles heavier than said washwater arranged in the space enclosed by said cylindrically shaped screen between said flat screen and said openable closure means during filtering and separating operations;
   said partition means together with said openable closure means, when closed, dividing said vessel into upper and lower isolated sections, said liquids to be separated passing upwardly through said upright pipe member, through the perforations therein, radially through said particles and said cylindrically shaped screen and into said lower section;
   a washwater outlet means connected into said upper section, said washwater during washing operations, flowing from said washwater inlet means upwardly through said particles, when said openable closure means is open, forcing particles into said upper section; said washwater discharging through said washwater outlet;
   said particles returning to the space enclosed by said cylindrically shaped screen when said wash operation has been completed; and
   means in said lower section for separately discharging said oil and said water from said vessel.

* * * * *